(12) United States Patent
Lee et al.

(10) Patent No.: US 11,003,012 B2
(45) Date of Patent: May 11, 2021

(54) LIQUID CRYSTAL DISPLAY DEVICE AND MANUFACTURING METHOD THEREOF

(71) Applicant: Samsung Display Co., Ltd., Yongin-Si (KR)

(72) Inventors: Jeong Ho Lee, Seoul (KR); Dong Wook Kim, Seoul (KR); Su Jin Lee, Siheung-si (KR); Jean Ho Song, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/373,327

(22) Filed: Apr. 2, 2019

(65) Prior Publication Data
US 2019/0227373 A1     Jul. 25, 2019

Related U.S. Application Data

(62) Division of application No. 15/250,470, filed on Aug. 29, 2016, now Pat. No. 10,288,925.

(30) Foreign Application Priority Data

Nov. 24, 2015     (KR) .................. 10-2015-0164548

(51) Int. Cl.
*G02F 1/1335* (2006.01)
*G02F 1/1362* (2006.01)
(Continued)

(52) U.S. Cl.
CPC .... *G02F 1/133512* (2013.01); *G02F 1/13394* (2013.01); *G02F 1/13439* (2013.01);
(Continued)

(58) Field of Classification Search
CPC .................................... G02F 1/133512
See application file for complete search history.

(56) References Cited

U.S. PATENT DOCUMENTS 9,176,339 B2    11/2015   Kim et al.
9,575,353 B2     2/2017   Jang et al.
(Continued)

FOREIGN PATENT DOCUMENTS

CN     102346339 A     2/2012
CN     104102038 A    10/2014
(Continued)

OTHER PUBLICATIONS

Uropean Search Report corresponding to 16182219.2, pp. 1-13, dated Apr. 19, 2017.

*Primary Examiner* — Edmond C Lau
(74) *Attorney, Agent, or Firm* — Innovation Counsel LLP

(57) ABSTRACT

A liquid crystal display (LCD) device, comprising: a substrate, gate wiring including a gate line that is disposed on the substrate to extend in a first direction and a gate electrode that is connected to the gate line, a data conductor disposed on the gate wiring and including a data line that extends in a second direction different from the first direction, and a first electrode that overlaps the gate electrode, a common electrode disposed on the data conductor and including a first opening that partially exposes the first electrode therethrough, an opaque conductive pattern disposed on the common electrode; and a pixel electrode disposed on the opaque conductive pattern and electrically connected to the first electrode exposed through the first opening.

6 Claims, 18 Drawing Sheets

(51) Int. Cl.
 *G02F 1/1333* (2006.01)
 *G02F 1/1339* (2006.01)
 *G02F 1/1343* (2006.01)
 *G02F 1/1368* (2006.01)

(52) U.S. Cl.
 CPC .. G02F 1/133345 (2013.01); G02F 1/133514 (2013.01); G02F 1/134309 (2013.01); G02F 1/136209 (2013.01); G02F 1/136286 (2013.01); G02F 1/1368 (2013.01); *G02F 1/133302* (2021.01); *G02F 1/134318* (2021.01); *G02F 1/134372* (2021.01); *G02F 1/136222* (2021.01); *G02F 1/136227* (2013.01); *G02F 1/136295* (2021.01); *G02F 2201/121* (2013.01); *G02F 2201/123* (2013.01); *G02F 2202/16* (2013.01)

(56) References Cited

U.S. PATENT DOCUMENTS

| | | | |
|---|---|---|---|
| 2011/0176100 A1* | 7/2011 | Nishida | G02F 1/134363 349/143 |
| 2012/0019748 A1 | 1/2012 | Kim et al. | |
| 2014/0285744 A1 | 9/2014 | Son et al. | |
| 2014/0313463 A1* | 10/2014 | Jang | G02F 1/136209 349/106 |
| 2015/0219968 A1 | 8/2015 | Zhao et al. | |
| 2015/0228675 A1 | 8/2015 | Takanishi et al. | |
| 2017/0248827 A1* | 8/2017 | Zhang | G02F 1/134309 |
| 2018/0172881 A1* | 6/2018 | Zhang et al. | G02F 1/1362 |

FOREIGN PATENT DOCUMENTS

| | | |
|---|---|---|
| CN | 104730603 A | 6/2015 |
| EP | 2573617 A1 | 3/2013 |

\* cited by examiner

LIQUID CRYSTAL DISPLAY DEVICE AND MANUFACTURING METHOD THEREOF

This application is a divisional application of U.S. patent application Ser. No. 15/250,470 filed on Aug. 29, 2016, which claims priority under 35 USC § 119 to Korean Patent Application No. 10-2015-0164548 filed on Nov. 24, 2015 in the Korean Intellectual Property Office, the disclosures of which are incorporated herein by reference in their entirety.

BACKGROUND

1. Field of the Disclosure

The present disclosure relates to a liquid crystal display (LCD) device and a manufacturing method thereof.

2. Description of the Related Art

The importance of display devices has steadily grown with recent developments in multimedia technology. As a result, a variety of display devices, such as a liquid crystal display (LCD) device, an organic light-emitting diode (OLED) display device, and the like, have been developed and widespread.

An LCD device, which is a widely-used type of flat panel displays, generally includes two substrates on which field-generating electrodes, such as pixel electrodes and a common electrode, are formed and a liquid crystal layer that is interposed between the two substrates. The LCD device forms an electric field in the liquid crystal layer by applying a voltage to the field-generating electrodes, which determines the orientation of liquid crystal molecules in the liquid crystal layer and controls the polarization of light incident thereupon, thereby displaying an image.

The pixel electrodes and the common electrode, which are for forming an electric field, are disposed on a lower substrate on which thin-film transistors TFTs are arranged to be insulated from each other, and the LCD device may be driven in a Plane-to-Line Switching (PLS) mode in which the alignment of the liquid crystal molecules is controlled by a fringe field formed between the pixel electrodes and the common electrode.

However, the LCD device driven in the PLS mode may suffer from a crosstalk phenomenon, a decrease in black luminance, and a noise phenomenon on a touch panel due to ripples in a common voltage applied to the common voltage.

SUMMARY

Exemplary embodiments of the present disclosure provide a liquid crystal display (LCD) device capable of stabilizing ripples in a common voltage using a black matrix, and a manufacturing method of the LCD device.

Exemplary embodiments of the present disclosure also provide an LCD device in which a black matrix and a common electrode are placed in contact with each other, thereby reducing the number of mask processes for forming the black matrix, and a manufacturing method of the LCD device.

However, exemplary embodiments of the present disclosure are not restricted to those set forth herein. The above and other exemplary embodiments of the present disclosure will become more apparent to one of ordinary skill in the art to which the present disclosure pertains by referencing the detailed description given below.

According to an exemplary embodiment of the present disclosure, a liquid crystal display (LCD) device, may comprise: a substrate, gate wiring including a gate line that is disposed on the substrate to extend in a first direction and a gate electrode that is connected to the gate line, a data conductor disposed on the gate wiring and including a data line that extends in a second direction that is different from the first direction, and a first electrode that overlaps the gate electrode, a common electrode disposed on the data conductor and including a first opening that partially exposes the first electrode therethrough, an opaque conductive pattern disposed on the common electrode and a pixel electrode disposed on the opaque conductive pattern and electrically connected to the first electrode exposed through the first opening.

According to another exemplary embodiment of the present disclosure, the LCD device may comprise: a substrate, a gate line disposed on the substrate and extending in a first direction, a data line disposed on the gate line to be insulated from the gate line and extending in a second direction different from the first direction, and a switching device including a gate electrode connected to the gate line, a first electrode connected to the data line, and a second electrode spaced from the first electrode, an organic insulating layer disposed on the data line and exposing the second electrode of the switching device, a common electrode disposed on the organic insulating layer, an opaque conductive pattern disposed on the common electrode and directly contacting the common electrode and a pixel electrode disposed on the opaque conductive pattern and electrically connected to the second electrode of the switching device exposed by the organic insulating layer.

According to another exemplary embodiment of the present disclosure, a manufacturing method of an LCD device comprises: preparing a substrate on which a switching device having a first electrode exposed by an organic insulating layer is formed, forming a common electrode having a first opening, which overlaps the exposed first electrode of the switching device, on the organic insulating layer, forming an opaque conductive pattern on the common electrode to directly contact the common electrode, forming a second insulating layer on the opaque conductive pattern and the common electrode and forming a pixel electrode, which is electrically connected to the exposed first electrode of the switching device, on the second insulating layer.

According to the exemplary embodiments, an LCD device capable of stabilizing ripples in a common voltage using a black matrix, and a manufacturing method of the LCD device are provided.

In addition, an LCD device in which a black matrix and a common electrode are placed in contact with each other, thereby reducing the number of mask processes for forming the black matrix, and a manufacturing method of the LCD device are provided.

Other features and exemplary embodiments will be apparent from the following detailed description, the drawings, and the claims.

DETAILED DESCRIPTION OF THE EMBODIMENTS

The accompanying drawings are included to provide a further understanding of the inventive concepts disclosed herein and are incorporated in and constitute a part of this specification. Particularly, the accompanying drawings illustrate exemplary embodiments of the inventive concept and, together with the description, serve to explain principles of the inventive concept.

Figure 1:
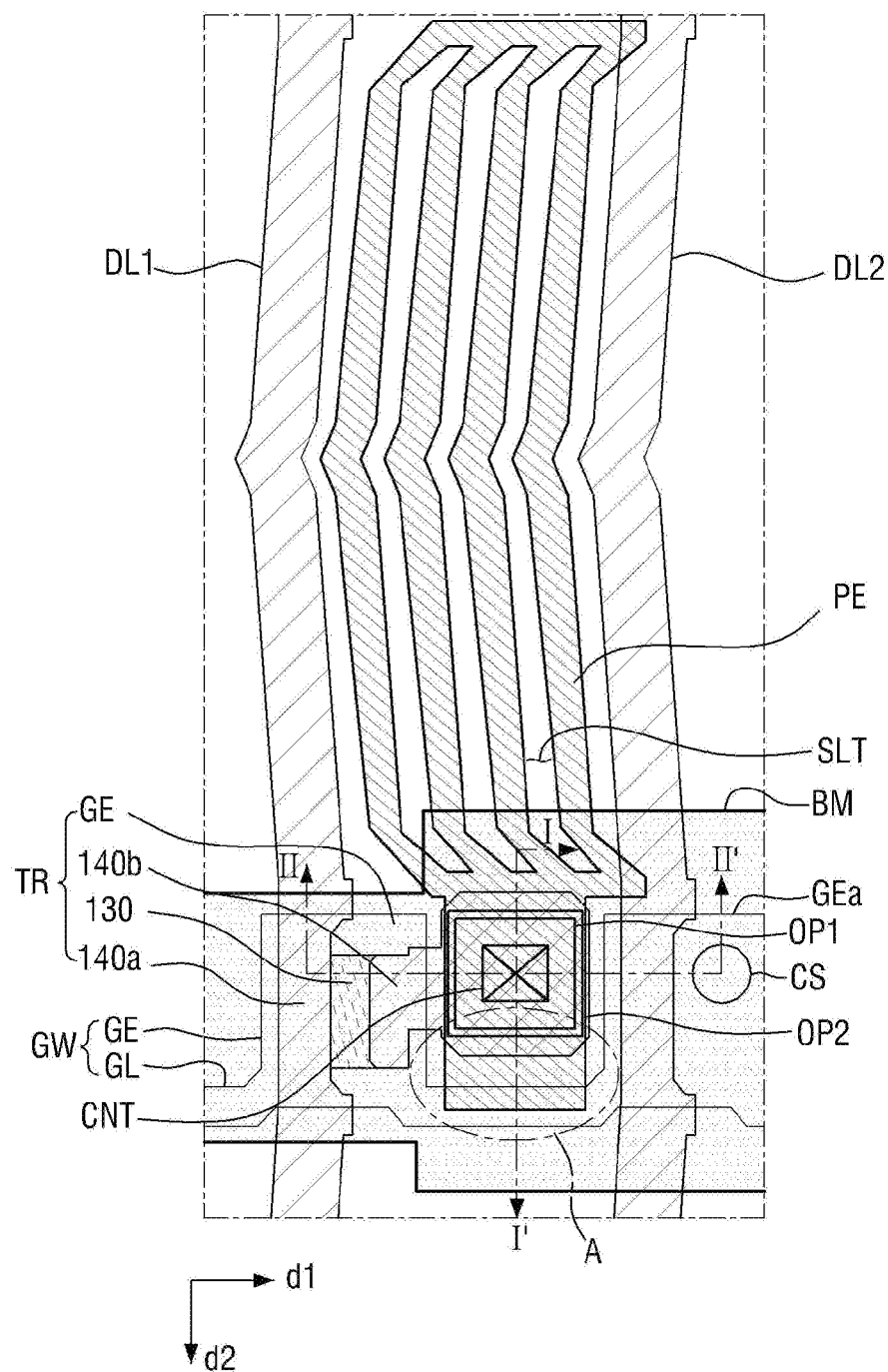
FIG. 1 is a layout view of a pixel unit of a liquid crystal display (LCD) device according to an exemplary embodiment of the present disclosure.

FIG. 1 is a layout view of a pixel unit of a liquid crystal display (LCD) device according to an exemplary embodiment of the present disclosure.

Referring to FIG. 1, a gate line GL is disposed to extend in a first direction d1. A first data line DL1 and a second data line DL2 are disposed to extend in a second direction d2. The first data line DL1 is disposed adjacent to the second data line DL2. The first direction d1 and the second direction d2 may intersect each other at right angles, as illustrated in FIG. 1. For example, the first direction d1 may be a row direction, and the second direction d2 may be a column direction.

A switching device TR and a pixel electrode PE are disposed in an area defined by the gate line GL and the first and second data lines DL1 and DL2 intersecting the gate line GL.

The switching device TR may be a tri-terminal device such as a thin-film transistor (TFT). In the description that follows, it is assumed that the switching device TR is a TFT. The switching device TR may be formed by a gate electrode GE, a first electrode 140a, and a second electrode 140b. More specifically, the gate electrode GE may be connected to the gate line GL, and the first electrode 140a may be connected to the first data line DL1. In an exemplary embodiment, the first electrode 140a may be formed in one body with the first data line DL1. The second electrode 140b may be electrically connected to the pixel electrode PE.

That is, the switching device TR may be turned on by a gate signal provided thereto from the gate electrode GE via the gate line GL. Accordingly, the switching device TR may provide a data signal provided thereto from the first data line DL1 via the first electrode 140a to the pixel electrode PE, which is connected to the second electrode 140b. In an exemplary embodiment, the first electrode 140a of the switching device TR may be a source electrode, and the second electrode 140b of the switching device TR may be a drain electrode. In the description that follows, it is assumed that the first electrode 140a and the second electrode 140b of the switching device TR are a source electrode and a drain electrode, respectively.

The pixel electrode PE may be electrically connected to the drain electrode 140b of the switching device TR via a contact hole CNT. The pixel electrode PE may be formed in a bent shape that is vertically symmetrical in the second direction d2. The pixel electrode PE may be disposed to at least partially overlap a common electrode (CE of FIG. 2). The pixel electrode PE may include a plurality of slits SLT, which extend in the second direction d2.

Due to the presence of the slits SLT, the pixel electrode PE may form a horizontal field together with the common electrode CE. A plurality of liquid crystal molecules 31 may be controlled by the horizontal field. The shape, the cross-sectional shape and the number of slits SLT of the pixel electrode PE are not limited to those illustrated in FIG. 1.

The pixel electrode PE may include an extension portion A. The extension portion A may at least partially overlap the gate line GL, which is described later in detail with reference to FIGS. 2 and 3.

The common electrode CE may be disposed to at least partially overlap the pixel electrode PE. In an exemplary embodiment, the common electrode CE may be plate-shaped. The common electrode CE may include a first opening OP1, which partially exposes the drain electrode 140b of the switching device TR therethrough.

An opaque conductive pattern BM may be disposed to cover the gate electrode GE of the switching device TR. The opaque conductive pattern BM may include a second opening OP2, which partially exposes the drain electrode 140b of the switching device TR therethrough. The second opening OP2 of the opaque conductive pattern BM may overlap the first opening OP1 of the common electrode CE. The opaque conductive pattern BM may be disposed to cover the entire switching device TR except for the drain electrode 140b of the switching device TR exposed through the second opening OP2.

That is, the opaque conductive pattern BM may be disposed to overlap an area excluding a pixel area in which the pixel electrode PE is disposed, for example, at least parts of the first and second data lines DL1 and DL2, the switching device TR, and the gate line GL. The opaque conductive pattern BM may prevent light from being transmitted to the area excluding the pixel area. That is, the opaque conductive pattern BM may perform the functions of a black matrix.

In an exemplary embodiment, the opaque conductive pattern BM may at least partially overlap the pixel electrode PE. Accordingly, a light leakage phenomenon that may occur depending on the alignment of liquid crystal molecules 31 between the pixel electrode PE (particularly, a lower part of the pixel electrode PE in FIG. 1) and the common electrode CE may be prevented.

The opaque conductive pattern BM may be disposed between the pixel electrode PE and the common electrode CE. The opaque conductive pattern BM may be disposed to be insulated from the pixel electrode PE, but placed in direct contact with the common electrode CE. That is, the opaque conductive pattern BM may directly contact the common electrode CE and may thus lower the resistance of the common electrode CE. As a result, ripple components in a common voltage Vcom, which is provided from the common electrode CE, may be reduced, and thus, the common voltage Vcom may be stably and uniformly applied.

The arrangement of the opaque conductive pattern BM and the relationship of the opaque conductive pattern BM with the other elements are hereinafter described with reference to FIGS. 2 through 4.

Figure 2:
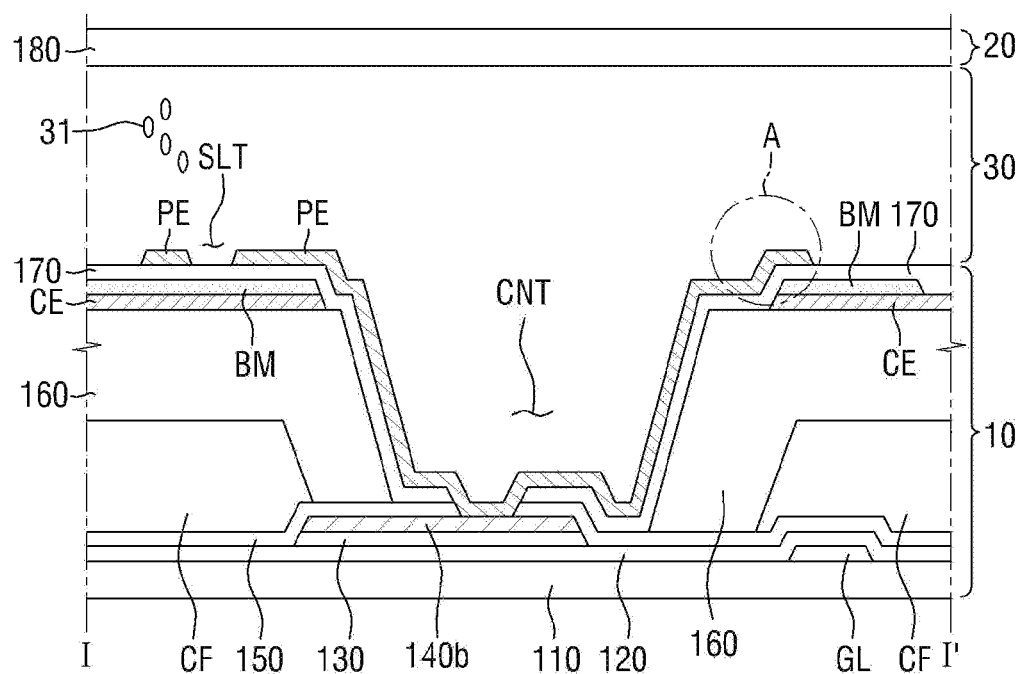
FIG. 2 is a cross-sectional view taken along line I-I' of FIG. 1.
Figure 3:
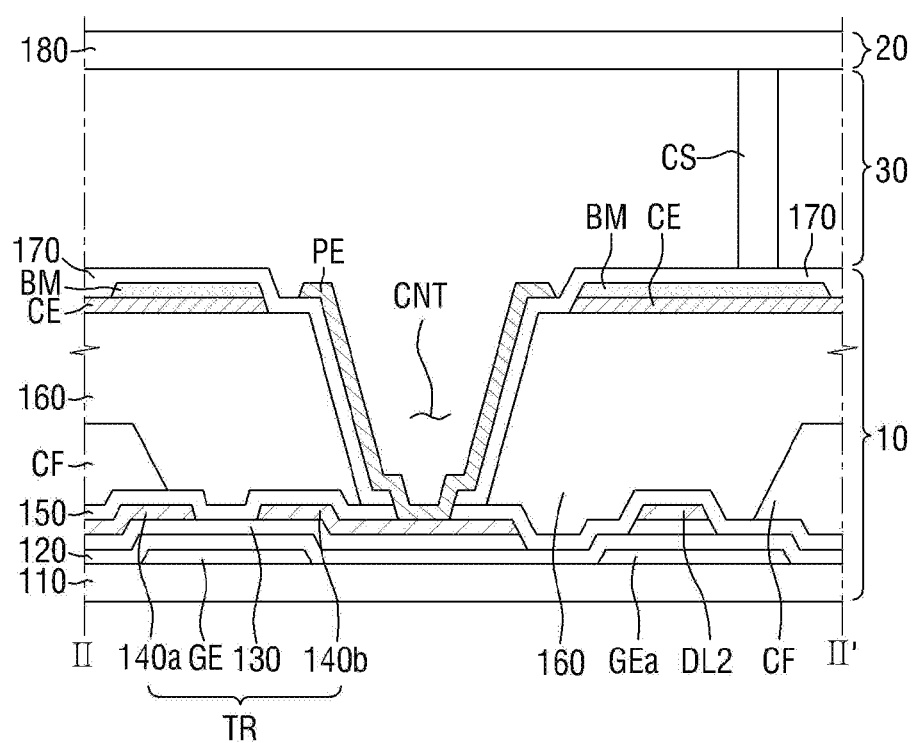
FIG. 3 is a cross-sectional view taken along line II-II' of FIG. 1.

FIG. 2 is a cross-sectional view taken along line I-I' of FIG. 1. FIG. 3 is a cross-sectional view taken along line II-II' of FIG. 1. FIG. 4 is an enlarged view of a black matrix illustrated in FIG. 1.

A lower display substrate 10 is bonded to an upper display substrate 20. A liquid crystal layer 30 is interposed between the lower display substrate 10 and the upper display substrate 20. That is, the lower display substrate 10 may be disposed to face the upper display substrate 20 and may be bonded to the upper display substrate 20 through sealing.

The lower display substrate 10 is hereinafter described.

A lower substrate 110 may be formed of a material having heat resistance and transparency. In an exemplary embodiment, the lower substrate 110 may be a transparent glass substrate or a plastic substrate. The lower substrate 110 may be an array substrate on which the switching device TR is disposed.

The gate line GL and the gate electrode GE may be disposed on the lower substrate 110. The gate electrode GE may protrude, or may be expanded, from the gate line GL toward a semiconductor pattern 130, which is described later. The gate electrode GE and the gate line GL may be connected to each other. The gate line GL and the gate electrode GE may be collectively referred to as gate wiring GW.

In an exemplary embodiment, the gate line GL and the gate electrode GE, i.e., the gate wiring GW, may be provided as a single layer formed of one conductive metal selected from among aluminum (Al), copper (Cu), molybdenum (Mo), chromium (Cr), titanium (Ti), tungsten (W), MoW, MoTi, and Cu/MoTi or as a double or triple layer formed of at least two conductive metals selected from among Al, Cu, Mo, Cr, Ti, W, MoW, MoTi, and Cu/MoTi.

A gate insulating layer 120 may be disposed on the gate wiring GW. In an exemplary embodiment, the gate insulating layer 120 may be formed of at least one selected from the group consisting of an inorganic insulating material such as silicon oxide (SiOx) or silicon nitride (SiNx) and an organic insulating material such as benzocyclobutene (BCB), an acrylic material and polyimide (PI) or the mixture thereof. The gate insulating layer 120 may have a multilayer structure including at least two insulating layers having different physical properties from each other.

The semiconductor pattern 130 may be disposed on the gate insulating layer 120. The semiconductor pattern 130 may have various shapes such as an island shape or a linear shape. The semiconductor pattern 130 may form the switching device TR together with the gate electrode GE, the source electrode 140a, and the drain electrode 140b. In an exemplary embodiment, if a data conductor DW, which is described later, and the semiconductor pattern 130 are formed together by the same process, the semiconductor pattern 130 may be disposed below the data conductor DW. The semiconductor pattern 130 may have an area disposed below the data conductor DW and may also have an area where the channel of the switching device TR is formed. That is, the entire semiconductor pattern 130 excluding the area where the channel of the switching device TR is formed may have substantially the same shape as the data conductor DW.

In an exemplary embodiment, the semiconductor pattern 130 may be formed of amorphous silicon or polycrystalline silicon. In this exemplary embodiment, an ohmic contact layer (not illustrated) may be provided between the semiconductor pattern 130 and the data conductor DW. The ohmic contact layer may be formed of a material such as n+ hydrogenated amorphous silicon doped with a high concentration of n-type impurities or may be formed of silicide.

In an alternative exemplary embodiment, the semiconductor pattern 130 may be formed of one oxide semiconductor selected from among indium gallium zinc oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. In this alternative exemplary embodiment, the ohmic contact layer may not be provided.

The data conductor DW may be disposed on the semiconductor pattern 130. The data conductor DW may include the first data line DL1, the second data line DL2, the source electrode 140a, and the drain electrode 140b. That is, the source electrode 140a and the drain electrode 140b of the switching device TR may be insulated from the gate electrode GE and the gate line GL, and may be disposed on the same layer as the first data line DL1 and the second data line DL2.

The data conductor DW may be provided as a single layer formed of one conductive metal selected from among Al, Cu, Mo, Cr, Ti, W, MoW, MoTi, and Cu/MoTi or as a double or triple layer formed of at least two conductive metals selected from among Al, Cu, Mo, Cr, Ti, W, MoW, MoTi, and Cu/MoTi. However, the present disclosure is not limited to this. That is, the data conductor DW may be formed of various metals or conductors other than those set forth herein.

In one exemplary embodiment, the source electrode 140a may be formed in one body with the first data line DL1, but the present disclosure is not limited thereto. That is, alternatively, the source electrode 140a may be formed to extend from the first data line DL1 toward the drain electrode 140b. The source electrode 140a may be disposed on the same layer as the drain electrode 140b, and may be spaced from the drain electrode 140b by a predetermined distance. Each of the source electrode 140a and the drain electrode 140b may be disposed to at least partially overlap the gate electrode GE.

The drain electrode 140b may be electrically connected to the pixel electrode PE. The pixel electrode PE may be disposed on a layer different from that of the drain electrode 140b. The drain electrode 140b may be electrically connected to the pixel electrode PE via the contact hole CNT.

A first passivation layer 150 may be disposed on the data conductor DW and the gate insulating layer 120. The first passivation layer 150 may have an opening that partially exposes the drain electrode 140b of the switching device TR therethrough. In an exemplary embodiment, the first passivation layer 150 may be formed of an inorganic insulating material such as silicon nitride or silicon oxide.

A color filter CF may be disposed on the first passivation layer 150. In an exemplary embodiment, the color filter CF may display one of red, green, and blue.

An organic insulating layer 160 may be disposed on the color filter CF and the first passivation layer 150. The organic insulating layer 160 may include an opening that overlaps the opening of the first passivation layer 150, and the drain electrode 140b of the switching device TR may be partially exposed through the opening of the organic insulating layer 160. The organic insulating layer 160 may comprise a photosensitive material, in which case, the process efficiency may be improved because there would be no need to use photoresist during the patterning of the organic insulating layer 160.

The common electrode CE may be disposed on the organic insulating layer 160. The common electrode CE may be plate-shaped in most parts except for the first opening OP1. That is, the common electrode CE may be provided on the entire surface of the lower substrate 110 excluding an area where the first opening OP1 is provided for preventing the common electrode CE from being short-circuited with the pixel electrode PE. The first opening OP1 may overlap the contact hole CNT, and the width of the first opening OP1 may be larger than the width of the contact hole CNT. However, the present disclosure is not limited to this. That is, alternatively, the common electrode CE may include a plurality of slits. The common electrode CE may be disposed to at least partially overlap the pixel electrode PE. The common electrode CE may form a horizontal field together with the pixel electrode PE and may thus control the alignment of the liquid crystal molecules 31. The common electrode CE may be formed of a transparent conductive material such as indium tin oxide (ITO) or indium zinc oxide (IZO).

The opaque conductive pattern BM may be disposed on the common electrode CE. The opaque conductive pattern BM may have a reflectance different from that of the data conductor DW. That is, the opaque conductive pattern BM may be formed of a material having a reflectance different from that of the data conductor DW.

More specifically, the opaque conductive pattern BM may comprise chromium oxide (CrOx). The opaque conductive pattern BM may be provided as a single layer formed of one conductive metal selected from among Al, Cu, Mo, Cr, Ti, W, MoW, MoTi, and Cu/MoTi or as a double or triple layer formed of at least two conductive metals selected from among Al, Cu, Mo, Cr, Ti, W, MoW, MoTi, and Cu/MoTi.

The opaque conductive pattern BM directly contacts the common electrode CE. Accordingly, the opaque conductive pattern BM may be electrically connected to the common electrode CE. More specifically, the common electrode CE may be formed of a transparent conductive material having a relatively high resistance, such as ITO or IZO. If the common voltage Vcom is directly applied from an external common voltage provider to the common electrode CE, the common voltage Vcom may not be able to be stably provided to the common electrode CE due to the high resistance of the common electrode CE, and as a result, a crosstalk defect, a decrease in black luminance or a noise phenomenon may occur in the pixel unit due to ripple components formed in the common voltage.

On the other hand, in the LCD device according to the present exemplary embodiment, the opaque conductive pattern BM, which is formed of a conductor having a lower resistance than the common electrode CE, is placed in contact with the common electrode CE, and as a result, the conductivity of the common electrode CE may be improved. Accordingly, the common electrode CE may be able to be stably provided with the common voltage Vcom from which the ripple components are removed, and as a result, a crosstalk defect, black luminance or a noise phenomenon may be improved.

The opaque conductive pattern BM is disposed to cover the entire switching device TR except for an exposed portion of the drain electrode 140b. Accordingly, light may be prevented from being transmitted to an area excluding a display area where light is transmitted through the color filter CF.

The opaque conductive pattern BM is insulated from the pixel electrode PE. The opaque conductive pattern BM may include the second opening OP2 for preventing the opaque conductive pattern BM from being short-circuited with the pixel electrode PE. The second opening OP2 of the opaque conductive pattern BM may be disposed to overlap the first opening OP1 of the common electrode CE and the contact hole CNT.

The opaque conductive pattern BM may at least partially overlap the pixel electrode PE. An area of overlap between the opaque conductive pattern BM and the pixel electrode PE may correspond to the lower part of the pixel electrode PE in FIG. 1. Due to the presence of the area of overlap between the opaque conductive pattern BM and the pixel electrode PE, light leakage that may occur between the lower part of the pixel electrode PE in FIG. 1 and the common electrode CE may be prevented.

Figure 4:
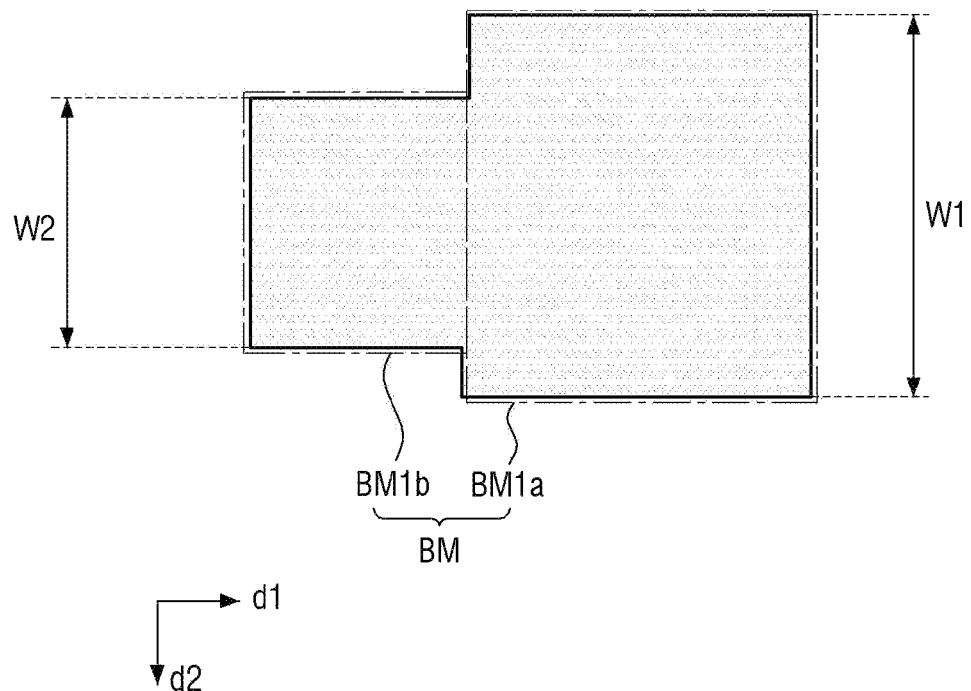
FIG. 4 is an enlarged view of a black matrix illustrated in FIG. 1.

Referring to FIG. 4, the opaque conductive pattern BM may include a first area BM1a having a first width w1 and a second area BM1b having a second width w2, which is different from the first width w1. In an exemplary embodiment, the first width w1 may be larger than the second width w2. A column spacer CS, which is described later, may be formed in the first area BM1a having the first width w1.

Although not specifically illustrated in the drawings, the opaque conductive pattern BM may at least partially overlap a neighboring pixel unit. For example, the opaque conductive pattern BM may overlap an upper part of a neighboring pixel electrode, thereby preventing light leakage that may occur between the common electrode CE and the upper part of the neighboring pixel electrode.

A second passivation layer 170 may be disposed on the common electrode CE and the opaque conductive pattern BM. The second passivation layer 170 may be formed of an inorganic insulating material such as silicon nitride or silicon oxide.

The pixel electrode PE may be disposed on the second passivation layer 170. The pixel electrode PE may be disposed to at least partially overlap the common electrode CE and the opaque conductive pattern BM. The pixel electrode PE is insulated from the common electrode CE and the opaque conductive pattern BM by the second passivation layer 170. The pixel electrode PE may be formed of a transparent conductive material such as ITO or IZO.

The pixel electrode PE includes the slits SLT. The slits SLT allow the pixel electrode PE and the common electrode CE to form a horizontal field therebetween and thus to rotate the liquid crystal molecules 31 in a particular direction. In an exemplary embodiment, the slits SLT may be disposed to extend in the second direction d2 and thus to be substantially in parallel to the direction in which the first data line DL1 and the second data line DL2 extend. Each of the slits SLT may be bent in the middle at an obtuse angle, and the pixel electrode PE may be divided into two different domains, i.e., upper and lower domains, along the bent portions of the slits SLT. However, the shape, size, and number of slits SLT are not limited to those illustrated in FIG. 1.

The pixel electrode PE may be electrically connected to the drain electrode 140b of the switching device TR via the contact hole CNT. Accordingly, in response to a data signal being applied to the pixel electrode PE via the first data line DL1, a fringe field is formed between the pixel electrode PE and the common electrode CE to which the common voltage Vcom is applied. As a result, the liquid crystal molecules 31, which are interposed between the lower display substrate 10 and the upper display substrate 20, are rotated, thereby realizing grayscale.

The pixel electrode PE may include the extension portion A. More specifically, the extension portion A of the pixel electrode PE may be formed to completely cover the second opening OP2 of the opaque conductive pattern BM. In an exemplary embodiment, the extension portion A may extend to overlap the gate line GL. That is, the extension portion A of the pixel electrode PE may additionally form a capacitor by overlapping the opaque conductive pattern BM.

The column spacer CS may be disposed on the pixel electrode PE. As described above, the opaque conductive pattern BM may include the first area BM1a having the first width w1 and the second area BM1b having the second width w2, which is less than the first width w1. The column spacer CS may be disposed to overlap the second area BM1b. In an exemplary embodiment, the column spacer CS may be circular in a cross-sectional view, but the present disclosure is not limited thereto.

Although not specifically illustrated, an alignment layer may be disposed on the pixel electrode PE. The alignment layer may be formed of PI. The alignment layer may be formed on the entire surface of the pixel electrode PE.

An upper substrate 180 may be disposed to face the lower substrate 110. The upper substrate 180 may be formed of a transparent glass or plastic material. That is, the upper substrate 180 may be formed of the same material as the lower substrate 110.

Although not specifically illustrated, an alignment layer may be disposed on the upper substrate 170. The alignment layer may be formed of PI. The alignment layer may be formed on the entire surface of the upper substrate 170.

That is, if the opaque conductive pattern BM is provided between the common electrode CE and the pixel electrode PE, no additional opaque conductive pattern BM may need to be provided on the upper substrate 180. Accordingly, by placing the opaque conductive pattern BM, which is formed of a low-reflectance conductor, in direct contact with the common electrode CE, the conductivity of the common electrode CE may be improved, and ripple components in the common voltage Vcom may be improved. Thus, black luminance may be lowered. Also, since no additional opaque conductive pattern BM is formed on the upper substrate 180, the number of additional mask processes may be reduced.

Also, since the opaque conductive pattern BM is not exposed to the liquid crystal layer 30, impurity ions in the opaque conductive pattern BM may be prevented from infiltrating into the liquid crystal layer 30.

Also, since the opaque conductive pattern BM is formed of a low-reflectance conductor, light leakage may be prevented, and as a result, black luminance may be lowered.

FIGS. 5 through 18 are schematic views illustrating a manufacturing method of an LCD device, according to an exemplary embodiment of the present disclosure.

Figure 5:
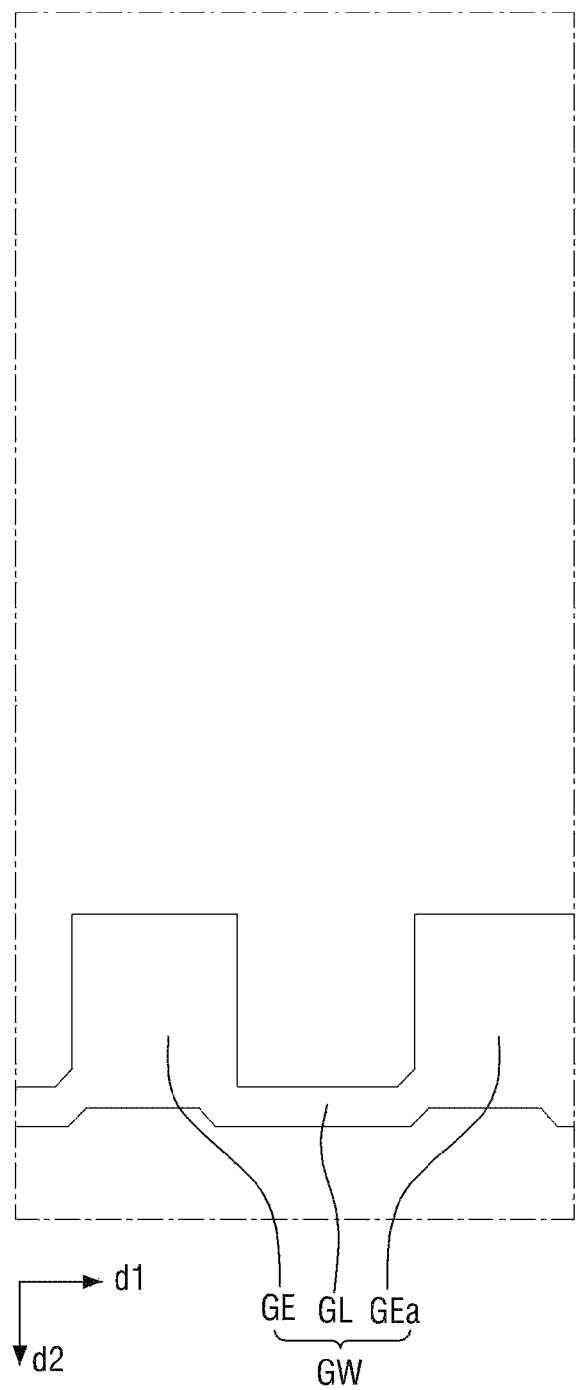
FIGS. 5, 6, 7, 8, 9, 10, 11, 12, 13, 14, 15, 16, 17 and 18 are schematic views illustrating a manufacturing method of an LCD device, according to an exemplary embodiment of the present disclosure.
Figure 6:
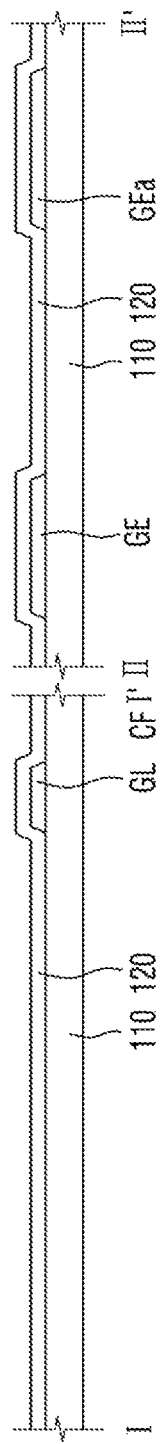

Referring to FIGS. 5 and 6, gate wiring (GW) is formed on a lower substrate 110. The gate wiring GW may include a gate line GL and gate electrodes GE and GEa, which extend from the gate line GL.

More specifically, the gate wiring GW, which includes the gate line GL and the gate electrodes GE and GEa, may be formed by forming a gate conductive layer on the lower substrate 110 and etching the gate conductive layer using a photosensitive layer pattern (not illustrated). The gate conductive layer may be formed as a single layer formed of one conductive metal selected from among Al, Cu, Mo, Cr, Ti, W, MoW, MoTi, and Cu/MoTi or as a double or triple layer formed of at least two conductive metals selected from among Al, Cu, Mo, Cr, Ti, W, MoW, MoTi, and Cu/MoTi.

Thereafter, the photosensitive layer pattern is removed, and a gate insulating layer 120 is formed on the gate wiring GW. The gate insulating layer 120 may be formed of at least one selected from the group consisting of an inorganic insulating material, such as silicon oxide (SiOx) or silicon nitride (SiNx), and an organic insulating material, such as BCB, an acrylic material and PI or the mixture thereof. In an exemplary embodiment, the gate insulating layer 120 may be formed by chemical vapor deposition (CVD). The gate insulating layer 120 may be formed on the entire surface of the lower substrate 110 where the gate wiring GW is formed.

Figure 7:
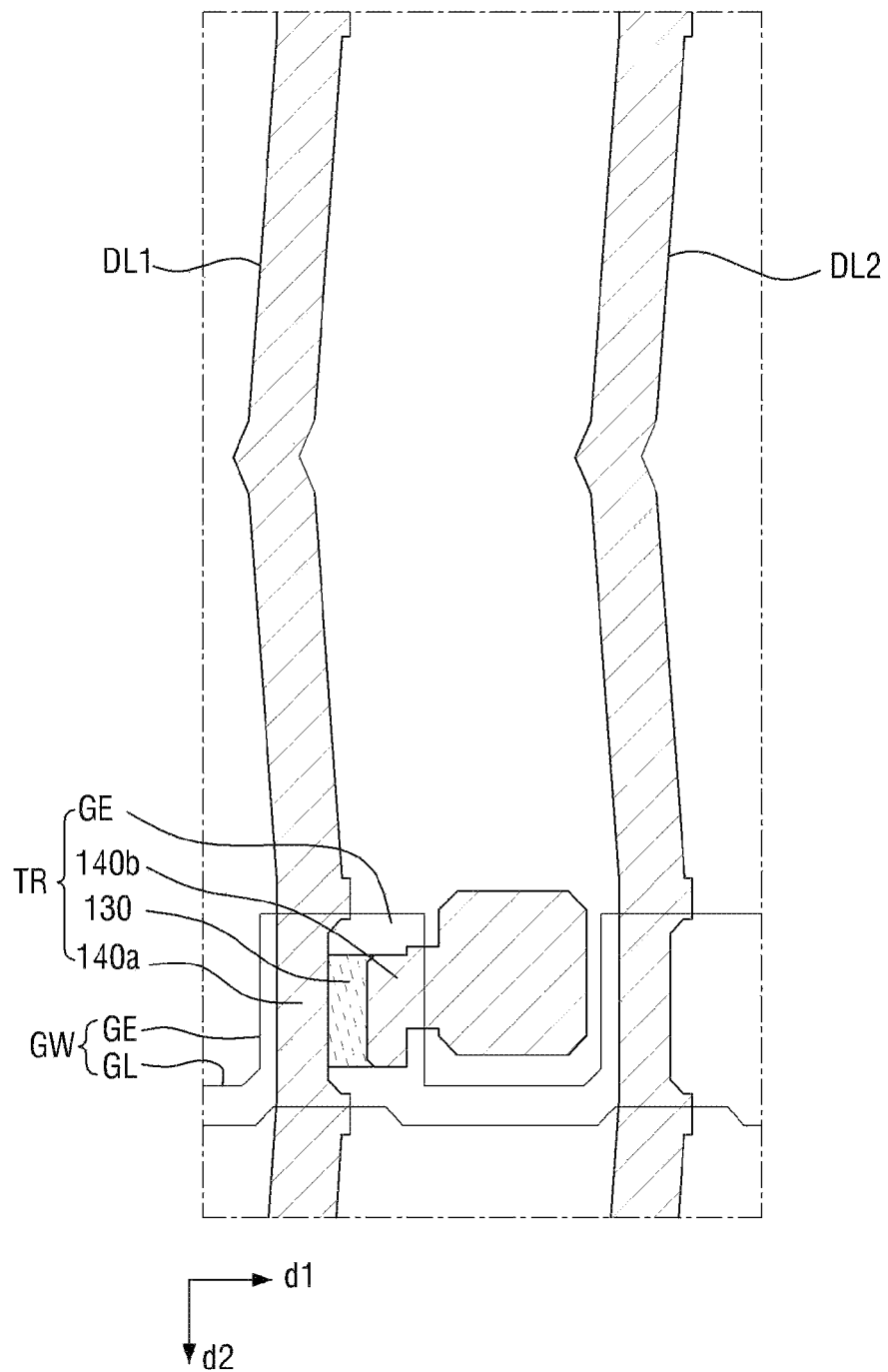
Figure 8:
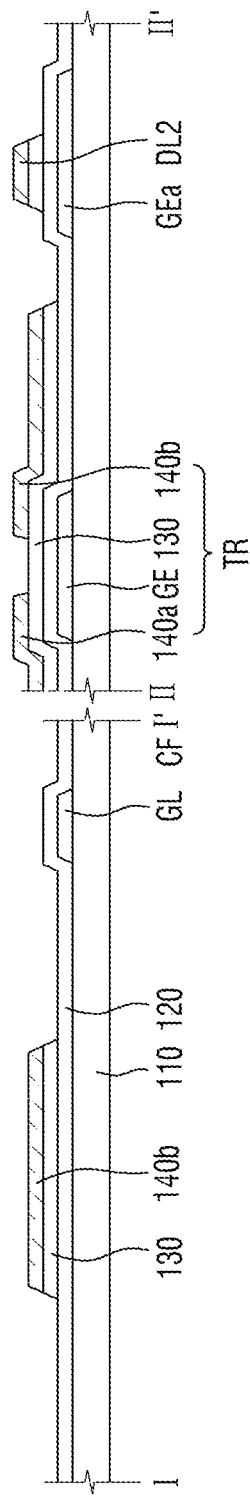

Referring to FIGS. 7 and 8, a semiconductor layer (not illustrated) and a first conductive material layer (not illustrated) are sequentially deposited on the gate insulating layer 120. The semiconductor layer may be formed by depositing amorphous silicon or polycrystalline silicon through CVD.

Alternatively, the semiconductor layer may be formed of an oxide semiconductor. The first conductive material layer may be formed as a single layer formed of one conductive metal selected from among Al, Cu, Mo, Cr, Ti, W, MoW, MoTi, and Cu/MoTi or as a double or triple layer formed of at least two conductive metals selected from among Al, Cu, Mo, Cr, Ti, W, MoW, MoTi, and Cu/MoTi.

Thereafter, a photosensitive layer pattern is applied onto the first conductive material layer, and a mask process is performed using a halftone mask or a slit mask. As a result, the semiconductor layer is etched, thereby forming a semiconductor pattern 130, and the first conductive material layer is etched, thereby forming a data conductor DW. That is, the semiconductor pattern 130 and the data conductor DW may be formed by the same mask process. Accordingly, the semiconductor pattern 130 may be formed below the data conductor DW.

The data conductor DW may include a first data line DL1, a second data line DL2, and a drain electrode 140b. The first data line DL1 may be formed in one body with a source electrode 140a. As a result of the mask process, a switching device TR including the gate electrode GE, the semiconductor pattern 130, the source electrode 140a, and the drain electrode 140b may be obtained.

Figure 9:
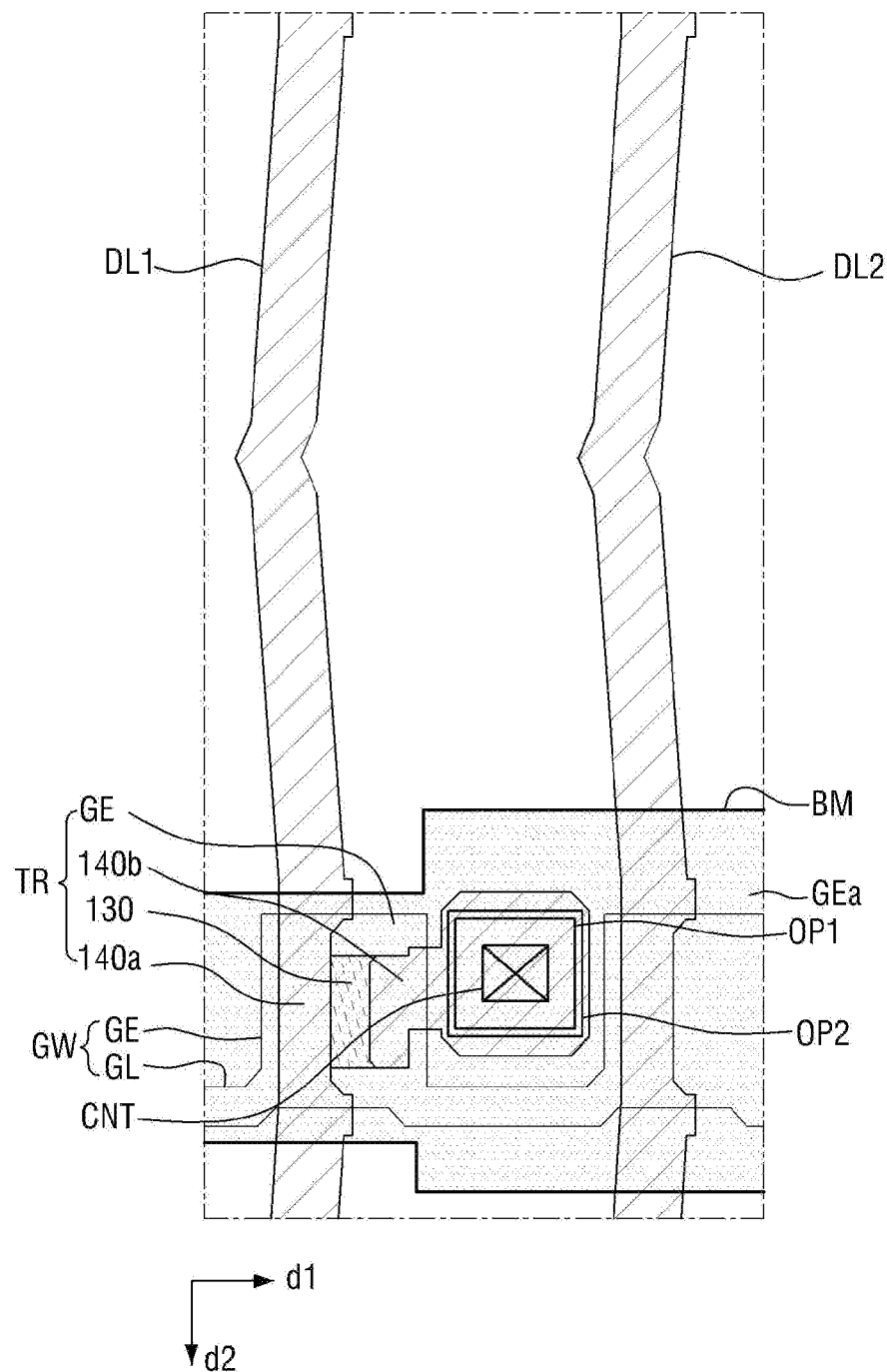
Figure 10:
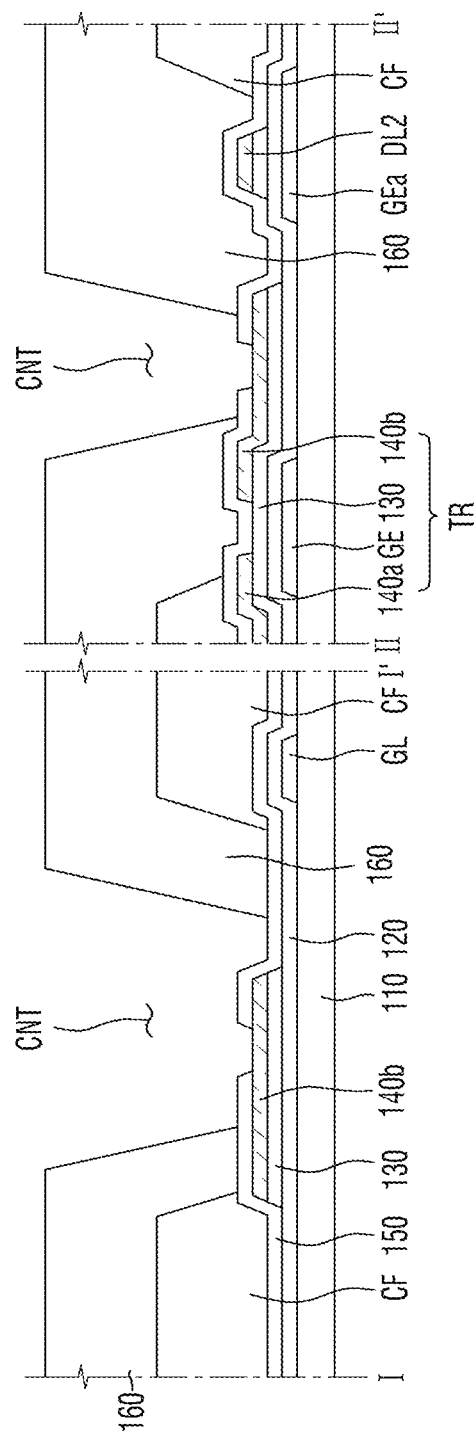

The formation of a first passivation layer 150, a color filter CF, and an organic insulating layer 160 is hereinafter described with reference to FIGS. 9 and 10. First, a first inorganic insulating layer (not illustrated) may be formed on the semiconductor pattern 130, the first data line DL1, the second data line DL2, the source electrode 140a, and the drain electrode 140b. In an exemplary embodiment, the first inorganic insulating layer may be formed of an inorganic insulating material such as silicon nitride or silicon oxide.

Thereafter, the color filter CF may be formed on the first inorganic insulating layer. In an exemplary embodiment, the color filter CF may include three color filter layers displaying red, green, and blue, respectively. The three color filter layers may be formed by separate mask processes.

Thereafter, an organic insulating pattern may be formed on the color filter CF and the first inorganic insulating layer. In an exemplary embodiment, the organic insulating pattern may comprise an organic material containing a photosensitive material. In this exemplary embodiment, an organic insulating layer 160 having a contact hole CNT may be formed by performing exposure and development using an optical mask.

Thereafter, the first passivation layer 150, which partially exposes the drain electrode 140b of the switching device TR via the contact hole CNT, may be formed by etching the first inorganic insulating layer below the organic insulating layer 160 using the organic insulating layer 160 as an etching mask.

In the present exemplary embodiment, the organic insulating pattern comprises a photosensitive material and is thus patterned by performing exposure and development without the aid of an additional photoresist pattern, but the present disclosure is not limited thereto. That is, alternatively, a photoresist pattern may be formed on the organic insulating pattern, and the organic insulating pattern and the first inorganic insulating layer may be sequentially etched.

Figure 11:
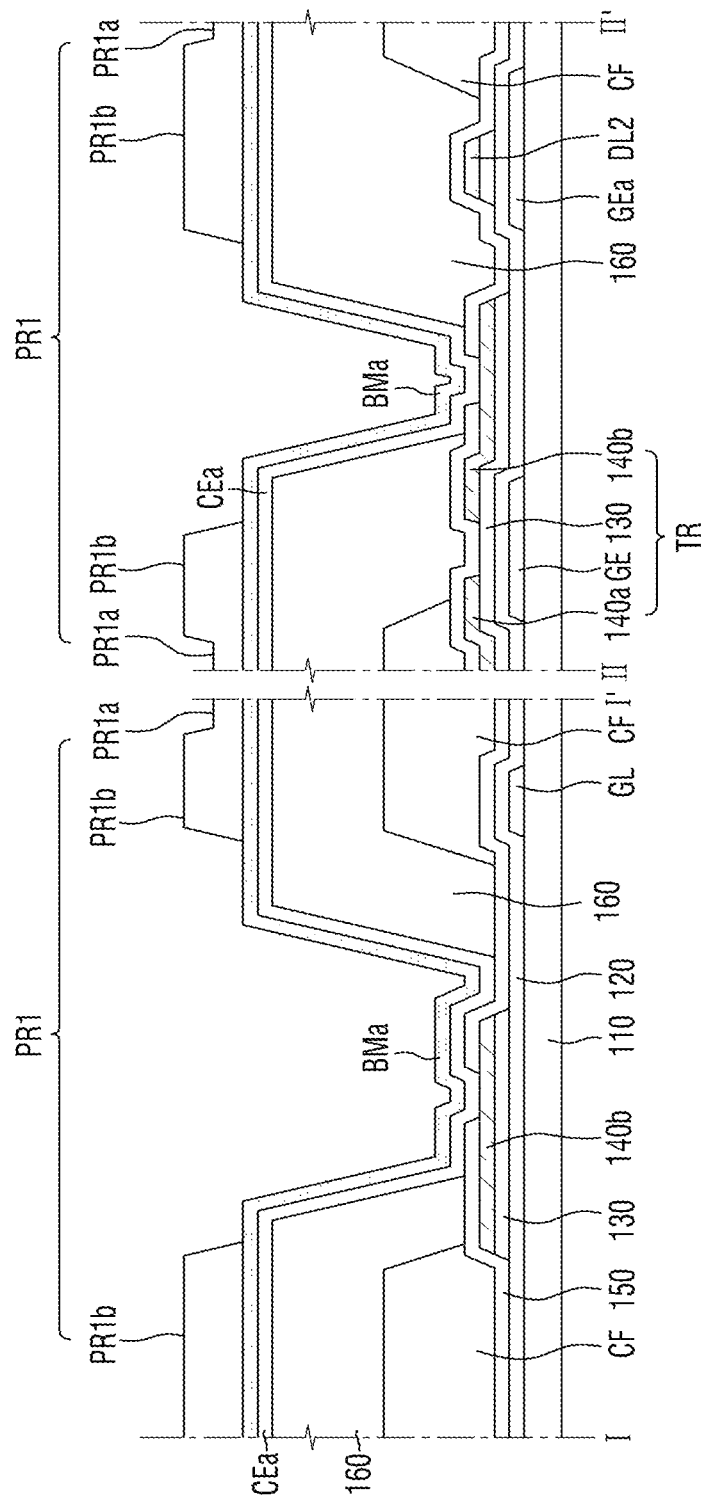

The formation of a common electrode CE and an opaque conductive pattern BM is hereinafter described with reference to FIGS. 9 and 11 through 15. Referring to FIG. 11, a second conductive material layer CEa and a first conductive metal layer BMa may be sequentially formed on the organic insulating layer 160. The second conductive material layer CEa may be formed of a transparent conductive material such as ITO or IZO. The first conductive metal layer BMa may comprise chromium oxide (CrOx). Alternatively, the first conductive metal layer BMa may be formed as a single layer formed of one conductive metal selected from among Al, Cu, Mo, Cr, Ti, W, MoW, MoTi, and Cu/MoTi or as a double or triple layer formed of at least two conductive metals selected from among Al, Cu, Mo, Cr, Ti, W, MoW, MoTi, and Cu/MoTi. That is, the first conductive metal layer BMa, unlike the common electrode CE, may be formed of an opaque material. The first conductive metal layer BMa may have a reflectance different from that of the data conductor DW. More specifically, the reflectance of the first conductive metal layer BMa may be lower than the reflectance of the data conductor DW. Thereafter, a first photosensitive layer pattern PR1 is formed by applying a photosensitive layer onto the first conductive metal layer BMa and subjecting the photosensitive layer to exposure and development using a halftone mask or a slit mask. The first photosensitive layer pattern PR1 may include a first area PR1a having a first thickness and a second area PR1b having a second thickness, which is larger than the first thickness. The first area PR1a may be a region where the common electrode CE is to remain, and the second area PR1b may be a region where both the common electrode CE and the opaque conductive pattern BM are both to remain.

Figure 12:
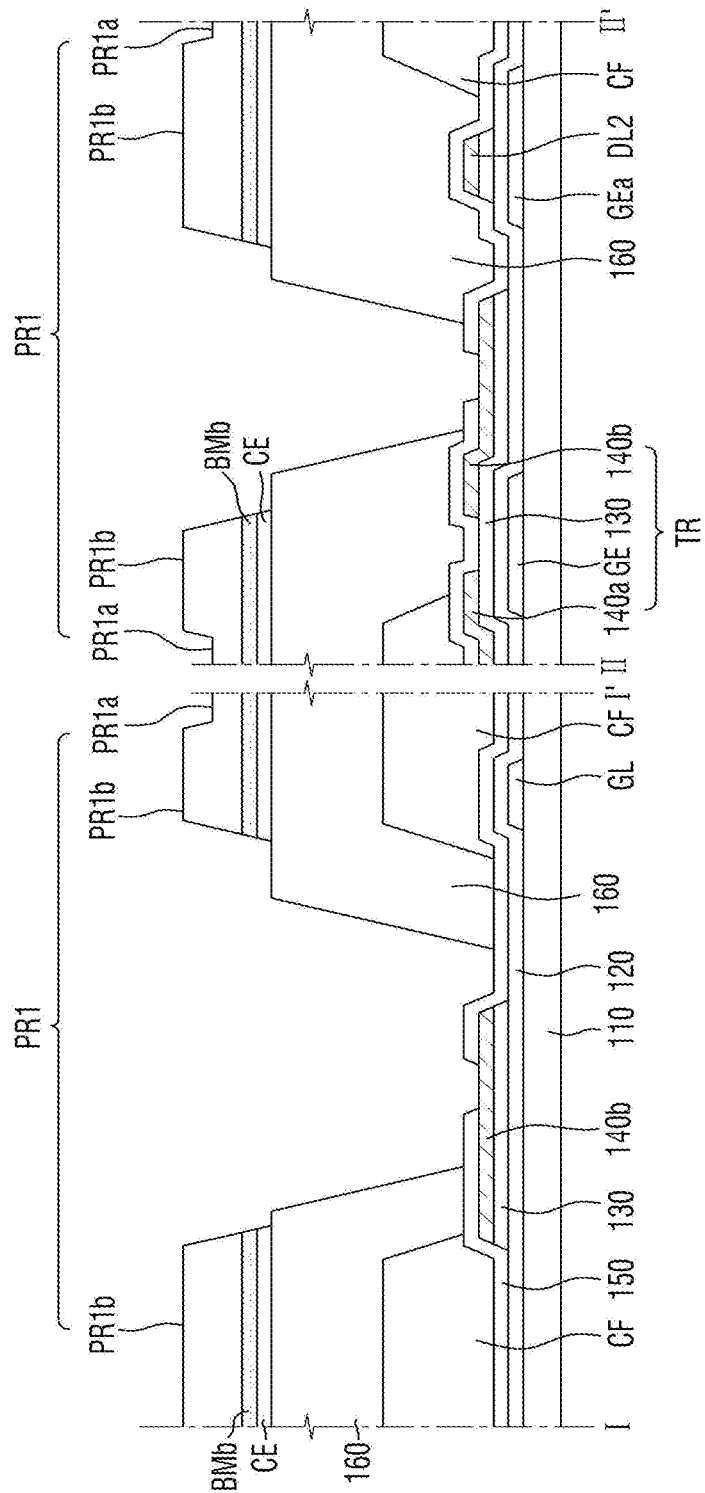

Referring to FIG. 12, by etching the first conductive metal layer BMa using the first photosensitive layer pattern PR1 as a mask, a second conductive metal layer BMb may be formed. By etching the second conductive material layer CEa exposed by the first conductive metal layer BM1, the common electrode CE may be formed. The common electrode CE may include a first opening OP1 for preventing the common electrode CE from being short-circuited with a pixel electrode PE, which is described later.

Figure 13:
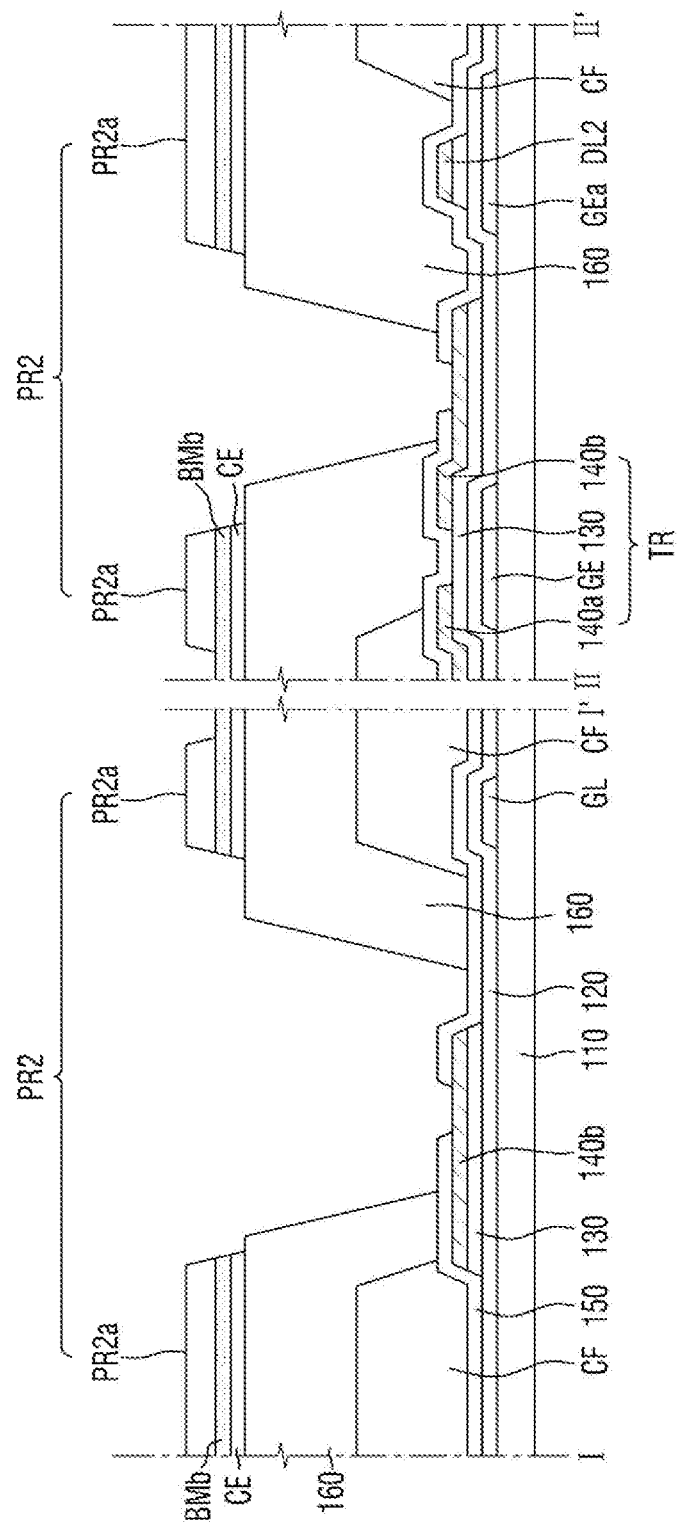

Thereafter, referring to FIG. 13, by generally reducing the thickness of the first photosensitive layer pattern PR1, the first area PR1a may be removed, and the thickness of the second area PR1b may also be reduced. That is, a second photosensitive layer pattern PR2 having a third area PR2a may be formed. The second photosensitive layer pattern PR2 may be formed by an etch-back or ashing process. As a result of the formation of the second photosensitive layer pattern PR2, the second conductive metal layer BMb is partially exposed.

Figure 14:
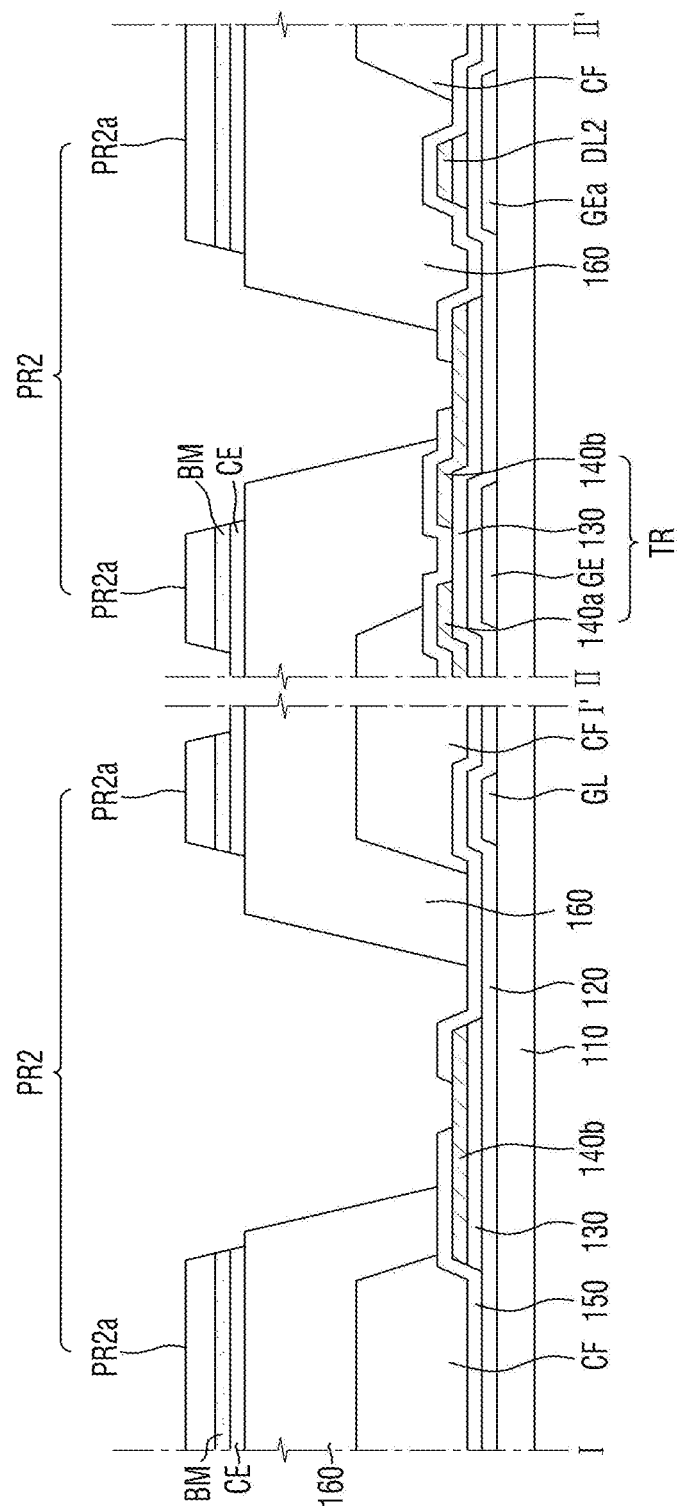
Figure 15:
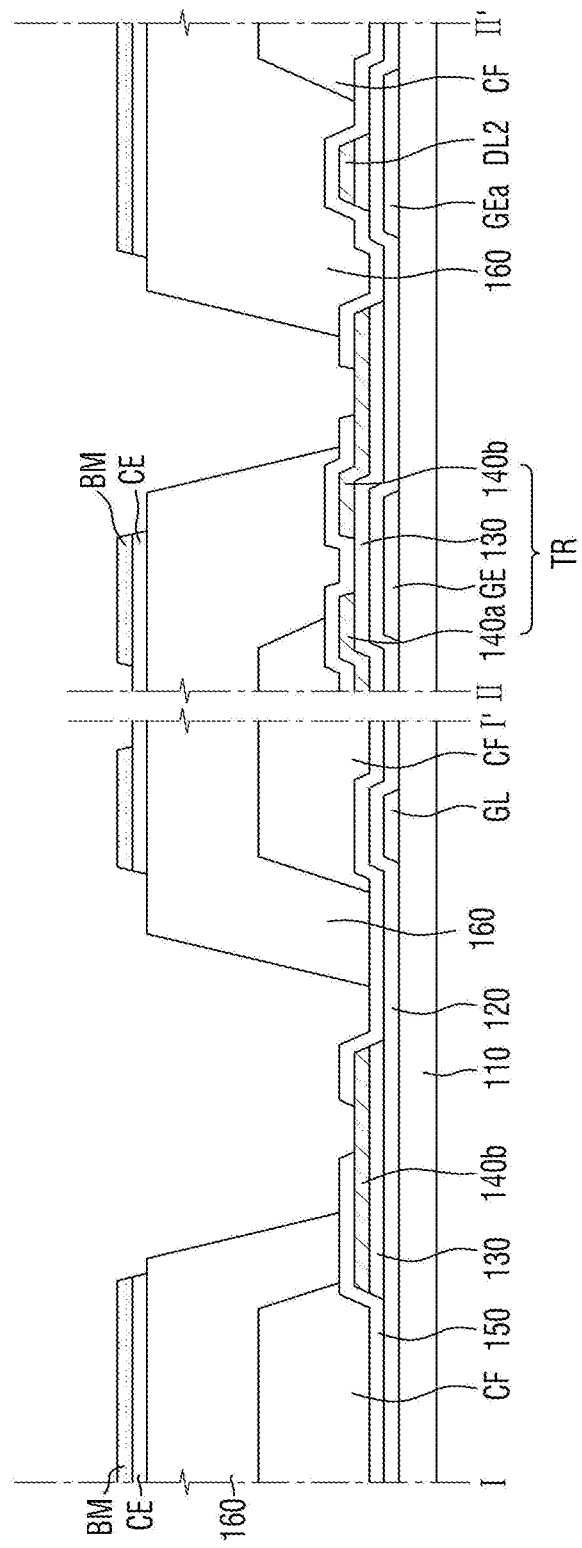

Referring to FIG. 14, the second conductive metal layer BMb may be etched using the second photosensitive layer pattern PR2 as a mask. As a result, the opaque conductive pattern BM may be formed. The opaque conductive pattern BM may include a second opening OP2, which overlaps the first opening OP1 of the common electrode CE. FIG. 9 illustrates the second opening OP2 having a larger area than the first opening OP1, but the present disclosure is not limited thereto. That is, the area of the second opening OP2 may be substantially identical (e.g., substantially the same size and shape) to the area of the first opening OP1. Thereafter, referring to FIG. 15, the second photosensitive layer pattern PR2 may be removed.

Figure 16:
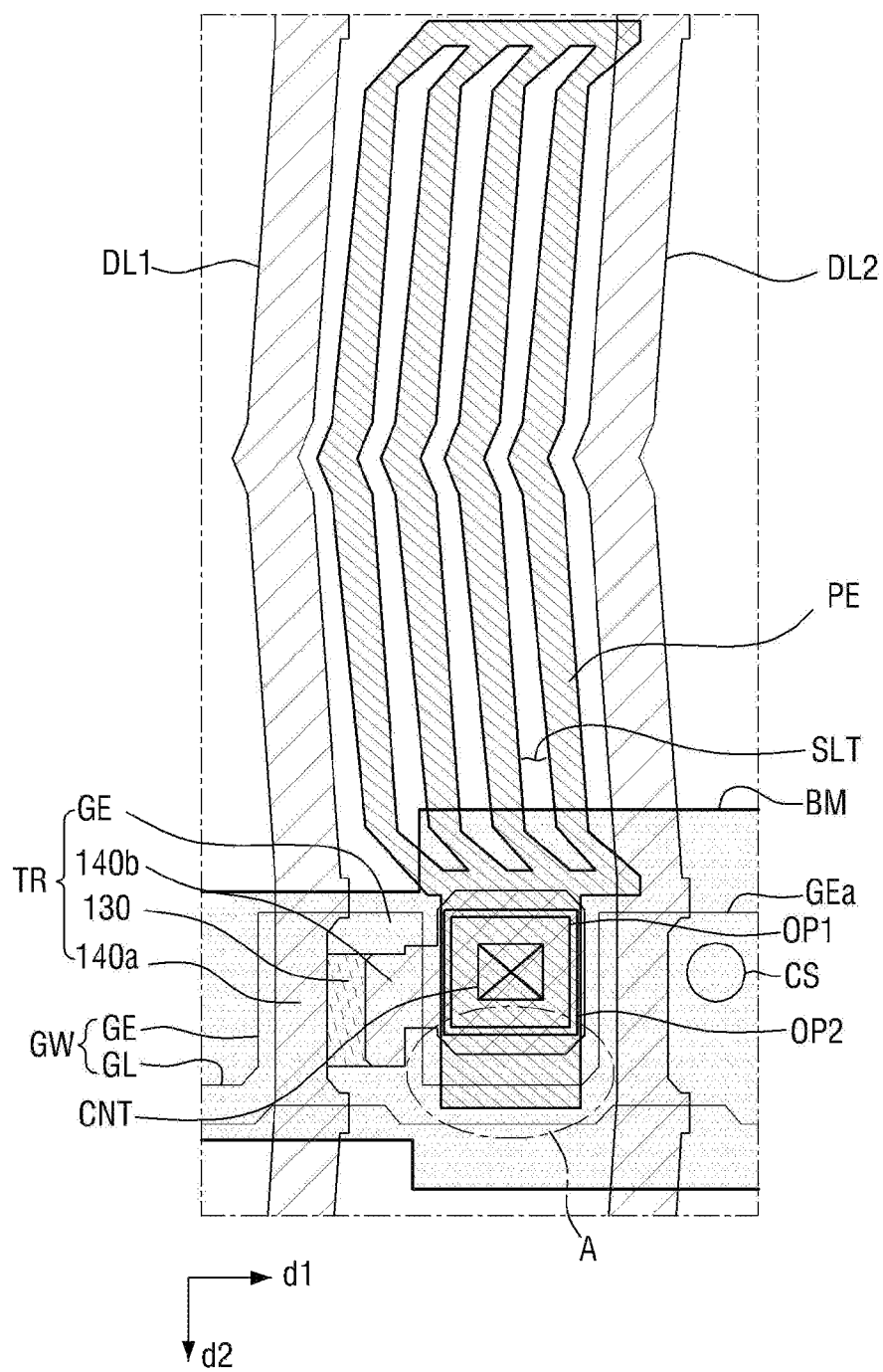
Figure 17:
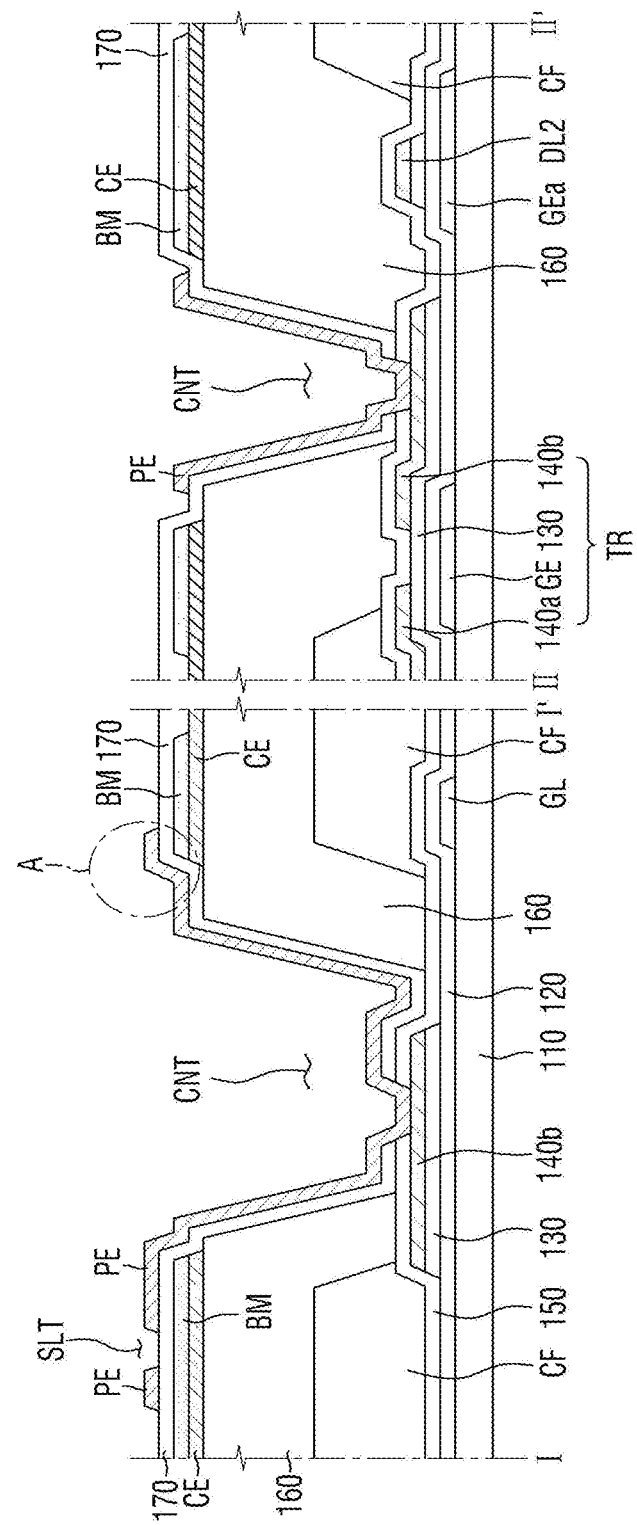

Referring to FIGS. 16 and 17, a second passivation layer 170 may be provided on the common electrode CE and the opaque conductive pattern BM. The second passivation layer 170 may be formed of an inorganic insulating material, such as silicon nitride or silicon oxide, or an organic insulating material. Although not specifically illustrated in the drawings, a contact hole CNT, which exposes the drain electrode 140b therethrough, may be formed by selectively etching the second passivation layer 170.

The pixel electrode PE may be provided on the second passivation layer 170. More specifically, a transparent conductive material layer (not illustrated) may be formed on the second passivation layer 170. The transparent conductive material layer may comprise one selected from the group consisting of transparent materials including ITO and IZO. Thereafter, the transparent conductive material layer is selectively etched by a mask process, thereby forming the pixel electrode PE, which at least partially overlaps the common electrode CE.

The pixel electrode PE may include a plurality of slits SLT. The pixel electrode PE may also include an extension portion A. More specifically, the extension portion A of the pixel electrode PE may be formed to completely cover the second opening OP2 of the opaque conductive pattern BM. In an exemplary embodiment, the extension portion A may extend to overlap the gate line GL.

Figure 18:
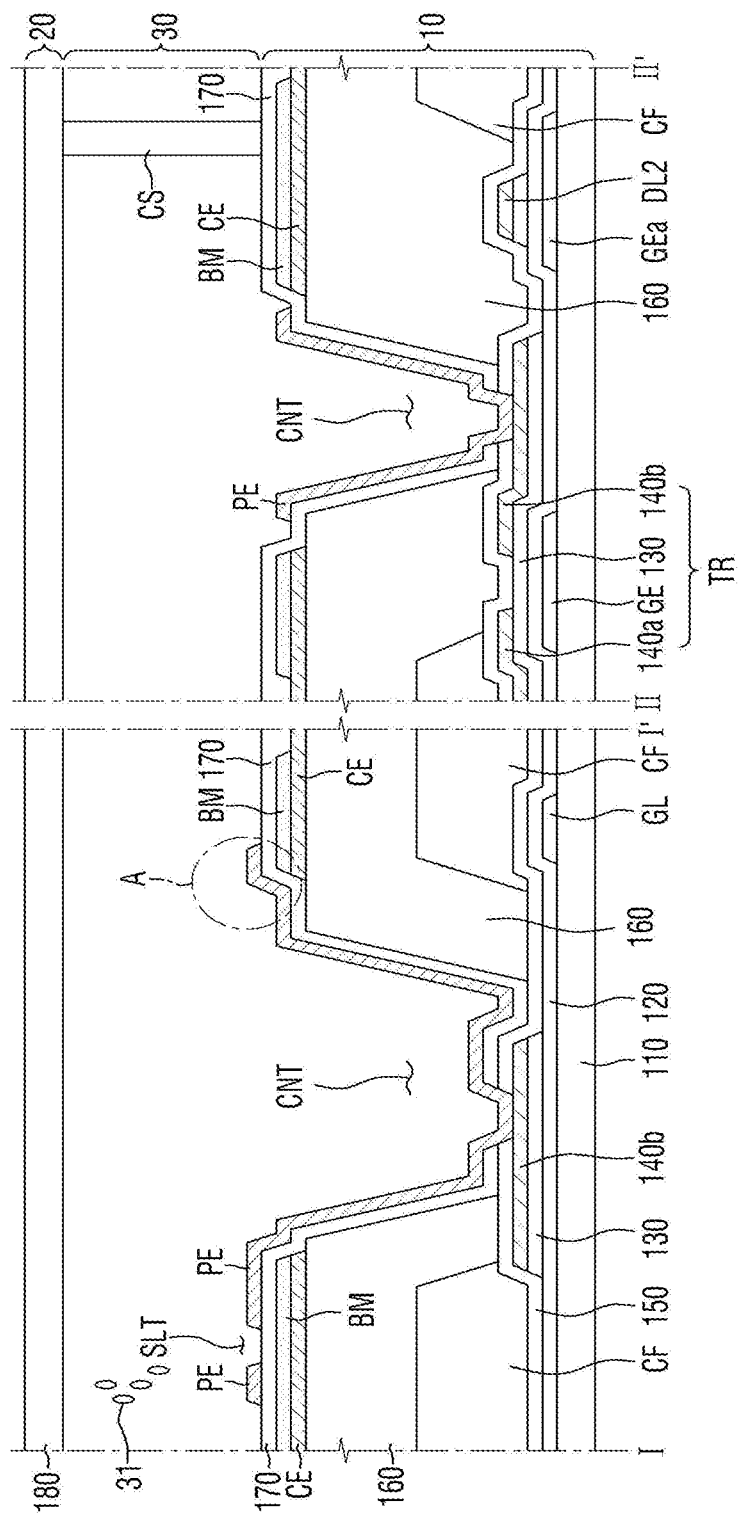

Thereafter, referring to FIG. 18, a column spacer CS may be formed in the first area BM1a of the opaque conductive pattern BM, and the lower substrate 110 and the upper substrate 180 may be bonded to each other.

The exemplary embodiments of the present disclosure have been described with reference to the accompanying drawings. However, those skilled in the art would appreciate that many variations and modifications may be made to the disclosed embodiments without substantially departing from the principles disclosed herein. Therefore, the presently disclosed embodiments are used in a generic and descriptive sense only and not for purposes of limitation.

What is claimed is:

1. A manufacturing method of an LCD device, comprising:
    preparing a substrate on which a switching device having a first electrode exposed by an organic insulating layer is formed;
    forming a common electrode on the organic insulating layer;
    forming an opaque conductive pattern on the common electrode to directly contact the common electrode;
    forming a first opening in the common electrode which overlaps the exposed first electrode of the switching device and a second opening in the opaque conductive pattern;
    forming a second insulating layer on the opaque conductive pattern and the common electrode; and
    forming a pixel electrode, which is electrically connected to the exposed first electrode of the switching device, on the second insulating layer,
    wherein the opaque conductive pattern is formed of a conductor having a lower resistance than the common electrode,
    wherein the opaque conductive pattern does not overlap the first opening,
    wherein an edge of the second opening is disposed outside of an edge of the first opening in a plan view, and
    wherein the edge of the second opening completely surrounds the edge of the first opening in the plan view.

2. The manufacturing method of claim 1, wherein the preparing the substrate, comprises:
    forming gate wiring gate wiring including a gate line that is disposed on the substrate to extend in a first direction and a gate electrode that is connected to the gate line;
    forming a gate insulating layer on the gate wiring;
    forming a data line, which extends in a second direction that is different from the first direction, on the gate insulating layer;
    forming a first passivation layer on the data line;

forming a color filter on the first passivation layer; and forming the organic insulating layer on the color filter.

3. The manufacturing method of claim 2, wherein the opaque conductive pattern covers a gate electrode of the switching device.

4. The manufacturing method of claim 1, wherein the opaque conductive pattern is at least partially overlapped by the pixel electrode.

5. The manufacturing method of claim 1, wherein the opaque conductive pattern comprises a material having a lower reflectance than that of a material included in the exposed first electrode of the switching device.

6. The manufacturing method of claim 1, wherein the pixel electrode completely covers the first opening.

* * * * *